(12) United States Patent
Migdal et al.

(10) Patent No.: US 8,867,853 B2
(45) Date of Patent: Oct. 21, 2014

(54) IMAGE PROCESSING TO PREVENT ACCESS TO PRIVATE INFORMATION

(75) Inventors: Joshua Migdal, Wayland, MA (US); Malay Kundu, Lexington, MA (US)

(73) Assignee: Stoplift, Inc., Cambridge, MA (US)

( * ) Notice: Subject to any disclaimer, the term of this patent is extended or adjusted under 35 U.S.C. 154(b) by 117 days.

(21) Appl. No.: 13/536,846

(22) Filed: Jun. 28, 2012

(65) Prior Publication Data

US 2013/0004090 A1 Jan. 3, 2013

Related U.S. Application Data

(60) Provisional application No. 61/501,872, filed on Jun. 28, 2011.

(51) Int. Cl.
| | |
|---|---|
| *G06K 9/00* | (2006.01) |
| *G07F 19/00* | (2006.01) |
| *G08B 13/196* | (2006.01) |
| *G07G 1/00* | (2006.01) |
| *H04N 7/18* | (2006.01) |
| *G06Q 20/20* | (2012.01) |

(52) U.S. Cl.
CPC ............ *G06Q 20/20* (2013.01); *G06K 9/00771* (2013.01); *G07F 19/207* (2013.01); *G08B 13/19686* (2013.01); *G07G 1/00* (2013.01); *H04N 7/18* (2013.01); *G06Q 20/206* (2013.01)
USPC ........... 382/232; 348/143; 382/103; 382/159; 382/274

(58) Field of Classification Search
CPC ................................................ G08B 13/19686
See application file for complete search history.

(56) References Cited

U.S. PATENT DOCUMENTS

| | | | | |
|---|---|---|---|---|
| 5,818,975 | A * | 10/1998 | Goodwin et al. | 382/274 |
| 7,227,893 | B1 * | 6/2007 | Srinivasa et al. | 375/240.08 |
| 7,825,950 | B2 * | 11/2010 | Rottmann | 348/143 |
| 8,345,921 | B1 * | 1/2013 | Frome et al. | 382/103 |
| 8,345,963 | B2 * | 1/2013 | Tedesco et al. | 382/159 |
| 2002/0097332 | A1 | 7/2002 | Martin et al. | |
| 2004/0032493 | A1 | 2/2004 | Franke et al. | |
| 2005/0129272 | A1 * | 6/2005 | Rottman | 382/103 |
| 2006/0078047 | A1 | 4/2006 | Shu et al. | |
| 2007/0035617 | A1 | 2/2007 | Ko et al. | |
| 2007/0064974 | A1 * | 3/2007 | Ayachitula et al. | 382/103 |
| 2007/0182818 | A1 * | 8/2007 | Buehler | 348/143 |
| 2013/0108105 | A1 * | 5/2013 | Yoo et al. | 382/103 |

OTHER PUBLICATIONS

International Search Report mailed Dec. 10, 2012 in corresponding International Application No. PCT/US2012/044717.

* cited by examiner

*Primary Examiner* — Tsung-Yin Tsai
(74) *Attorney, Agent, or Firm* — Chapin IP Law, LLC

(57) ABSTRACT

A processing resource receives original image data by a surveillance system. The original image data captures at least private information and occurrence of activity in a monitored region. The processing resource applies one or more transforms to the original image data to produce transformed image data. Application of the one or more transforms sufficiently distorts portions of the original image data to remove the private information. The transformed image data includes the distorted portions to prevent access to the private information. However, the distorted portions of the video include sufficient image detail to discern occurrence of the activity in the retail environment.

26 Claims, 17 Drawing Sheets

FIG. 8

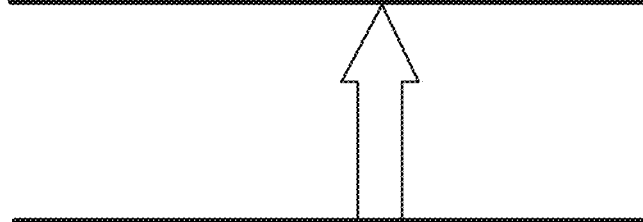
FIG. 11

FIG. 12

IMAGE PROCESSING TO PREVENT ACCESS TO PRIVATE INFORMATION

RELATED APPLICATIONS

This application is related to and claims the benefit of earlier filed U.S. Provisional Patent Application Ser. No. 61/501, 872 entitled "Identity Masking for Video Surveillance & Monitoring Applications," filed on Jun. 28, 2011, the entire teachings of which are incorporated herein by this reference.

BACKGROUND

Retail establishments commonly utilize point of sale or other transaction terminals, such as cash registers, to allow customers of those establishments to purchase items.

As an example, in a conventional department store, supermarket or other retail establishment, a customer collects items for purchase and places the items in a shopping cart, basket, or simply carries them to a point of sale terminal to purchase those items in a transaction. The point of sale terminal may be staffed with an operator such as a cashier who is a person employed by the store to assist the customer in completing the sales transaction. In some cases, retail establishments have implemented self-checkout point of sale terminals in which the customer is the operator and scans his items for purchase. In either case, the operator typically places items for purchase on a counter, conveyor belt or other item input area.

Point of sale terminals typically include a scanning device such as a laser or optical scanner system that operates to identify a Uniform Product Code (UPC) label or bar code affixed to each item that the customer desires to purchase. The laser scanner is usually a peripheral device coupled to a computer that is part of the POS terminal. To scan an item, an operator picks up each item, one by one, from the item input area such as a conveyor and passes each item over a scanning area such as glass window built into the counter or checkout area to allow the laser scanner to detect the UPC code. After the point of sale computer identifies the UPC code of an item, the point-of-sale scanning terminal performs a lookup in a database to determine the price and identity of the scanned item. Alternatively, in every case where the operator can scan the item, the operator may likewise enter the UPC or product identification code into the terminal manually or through an automatic product identification device such as an RFID reader.

As the operator scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been properly scanned by the point of sale terminal and in response, the operator places the item into an item output area such as a downstream conveyor belt or other area for retrieval of the items by the customer or for bagging of the items into a shopping bag.

As well known, after all items in the transaction are scanned in this manner, the operator indicates to the point of sale terminal that the scanning process is complete and the point of sale terminal displays a total purchase price to the customer who then pays the store for the items purchased in that transaction.

These conventional systems that provide for purchase of items using an automated item identification systems such as a scanner suffer from a variety of deficiencies. In particular, operation of such systems can be compromised, either knowingly or unknowingly, by an operator in a manner that allows a customer to receive possession of one or more items without paying for them. For example, such scanning systems are susceptible to "pass-throughs," also know as "sweethearting" in which an operator purposefully or accidentally fails to scan an item as that item moves through the transaction area. In such cases, the POS system never detects the un-scanned item and the item is thus never totaled into the purchase price. Thus, the customer can receive one or more items for free. Retail chains lose millions of dollars a year due to operator error or fraudulent activity of this nature.

In a non-fraudulent example, an operator may unknowingly pass an item through the scanning area during a transaction and place the item into the item output area such as a downstream conveyor belt, but no scan of the item took place. It is possible that the operator was not paying close attention and did not notice (or did not care) that the scanner failed to beep during scanning of an item.

As an example of "sweethearting" that represents fraud on the retail establishment, an operator assists a customer who is personally known to the operator (e.g. a friend or conspirator of the operator). The scan operator intentionally passes the item over a scan window without the item being detected by the scanner.

One way to prevent proper scanning is to cover or block the UPC label as it is passes by the scanner's detection window. In such a situation, the item is included with other items that may or may not have also been scanned, and the customer or operator continues along with a transaction as if the item was properly scanned.

After the operator processes all items in the transaction, either via actual scanning which is often done for the less expensive items to make the transaction look legitimate to anyone who may be watching, or via sweethearting in which case the item not scanned is grouped with items that appear to have be scanned, the customer pays the operator a purchase price reflecting only the sum total of the scanned items. After paying, the customer leaves the store with all items, having only paid for those items that were properly scanned or entered into the POS system.

In another fraudulent example known as label switching, the operator causes the POS system to scan an item that is different that the item being passed through the scanning area during the transaction. In such cases, a customer or operator may replace a UPC label of an original and often expensive item with a UPC label for another less expensive item. In such cases, a scan takes place but the wrong item is identified by the POS system. In this manner, the system will scan the item for a price that is substantially lower that the value of the item received by the customer.

Security system designers have attempted to develop conventional techniques for detecting fraudulent or accidental operator error in use of POS terminals. The conventional systems in the field of detection of pass-through and sweehearting provide for the detection of abnormally long "scangaps". A "scan-gap" is the amount of time between consecutive scans at the point of sale terminal. When an item is passed through a scanner region without scanning, the scan-gap increases until the next scan. By comparing the scan-gaps between scanned items of a transaction versus the average scan-gap for a given employee operator, the conventional scan-gap method seeks to identify incidents when an item has bypassed the scanner without being scanned.

The conventional scan-gap detection method is widely regarded to be impractical, as scan-gaps have been found to be a "noisy" measure at best. This is due to the fact that perfectly legitimate scan-gaps may vary widely due to delays such as those caused by weighing of produce, manual entry of unlabeled or un-scannable goods, and rescanning of items that did not get scanned on the first pass. As a result, scan-gaps are not a dependable metric for determining improper activity. Thus, conventional systems that attempt to use scan gaps as a method for detecting fraudulent activity are prone to problems.

Other conventional systems include a surveillance camera to record an in-person sales transaction on video. In such an instance, the video can be reviewed at a later time in the store to determine whether there were any scan errors associated with a particular sales transaction.

In many instances, surveillance cameras capture personal information as well as transactions, objects, etc., in a monitored region. In the digital world, theft of personal information is far more serious problem than ever before, as millions of records can be procured via a single breach of security. As such, consumers and corporations alike now demand that such information be secured against any such breaches.

Personal information comes in several forms. Personal information can be data, such as usernames, passwords, credit card numbers, names, telephone numbers, or social security numbers. Personal information can also include biometric data such as fingerprints, retinal prints, images of faces, etc.

BRIEF DESCRIPTION

In contrast to conventional techniques, embodiments herein include transforming images to prevent dissemination of personal/private information. Embodiments herein can be applied to any security application in which it is desirable to prevent access to the personal/private information.

More specifically, in accordance with one embodiment, a processing resource receives original image data such as data produced by a surveillance camera in a retail environment. The original image data captures or includes at least private information and occurrence of activity in the retail environment. The processing resource applies one or more transforms to the original image data to produce transformed image data. Application of the at least one transform sufficiently distorts portions of the original image data video to remove the private image information. The transformed image data includes the distorted portions to prevent access to the private information. The distorted portions of the image data include sufficient image detail to enable one to discern occurrence of the activity in the retail environment.

Accordingly, embodiments herein include transforming (e.g., modifying) original image data and/or images to prevent dissemination of private information, while still enabling a viewer to discern occurrence of different activity in the modified images. In other words, a degree of distorting the image data is limited such that the activity in captured by the images is still discernible although private information is no longer accessible.

As mentioned, the image data can be obtained from monitoring a retail environment. The modified images as recited by the transformed image data can be transmitted over a network to a processing location including human reviewers. The human reviewers can include equipment to render the transformed image data on a display screen to review the modified or transformed images. Based on viewing, the reviewers can detect occurrence of different types of activity such as theft, a customer in need of help, etc. Because the modified images do not include the personal information or private information captured in the original image data, there is no concern that the personal/private information of a customer, cashier, etc. in the retail environment will be publicly available or used in an unintended way.

Further embodiments as discussed herein can include a method of masking personally identifiable information (e.g., faces, text information, etc.) in video feeds taken from within retail environments such as an environment in which a person purchases items from a store. By way of a non-limiting example, the method of masking can include first obtaining at least a portion of video taken in a retail environment. For each frame of video, a video processor resource applies one or more image transforms (e.g., algorithms, functions, equations, etc.) to at least a portion of the frame of video. Via the image transform algorithm, the video processor modifies or distorts appropriate portions of the image to some degree to reduce an ability of a viewer to identify persons or objects therein upon playback of the distorted video. Even though (all or some) portions of the image may be obscured, the modified video information can include enough image details such that a viewer of the modified video is able to ascertain events that occur in the video.

In accordance with further embodiments, the video processor can apply one or more image transforms to part or substantially all of the images captured by the video. For example, entire frames (or substantially all of the frame) of images as captured by the video can be modified from their original form to remove personal or private information. In other words, substantially the entire video can be modified to sufficiently distort private information so that it is not discernable during playback. However, the distortion is not so great as to prevent a viewer from determining occurrence of activity in the video played back.

In accordance with yet another embodiment, application of the one or more image transforms over at least a portion of the frame of video can include detecting specific regions of interest within the frame representing items such as faces or other sensitive matter. Subsequent to detection of one or more regions of interest, the video processor applies the one or more image transforms at least over such regions of interest to prevent recognition of personal information such as a person(s) associated with the face(s) upon viewing of the images. Other regions can be distorted to a greater or lesser extent.

Further embodiments include identifying, for example, bounding boxes (e.g., bounded regions) of the video frames. The bounding boxes can indicate regions or locations of the video frames including moving objects in the video that are to be protected. In accordance with such an embodiment, a video processor or other suitable processing resource as discussed herein applies the one or more transforms to respective image data (e.g., representing moving objects captured by the video) inside of said bounding boxes to at least modify and/or obscure the video data in such bounded regions.

Yet further embodiments herein can include extracting sensitive information from a video or image data and including the sensitive information back into the video as encrypted data to prevent unauthorized persons from viewing the sensitive matter in the original video. More specifically, according to an embodiment herein, an image processor can be configured to subtract or determine a difference between a transformed frame of video from an original version of the video (e.g., video data before it is obscured or modified) in order to produce and extract a difference image. The difference image captures the data needed to convert obscured portions of the modified video back into the original video.

In accordance with yet further embodiments, the video processor can be configured to compress the difference image data. The video processor then encrypts the compressed difference image to prevent unauthorized persons from recreating the original video using the modified video. The video processor embeds the encrypted data back into the modified video data. The modified video (e.g., with obscured images) can be transmitted as a stream of video or feed. One embodiment herein includes storing the encrypted data (e.g., encrypted difference video) in the image stream as metadata.

In further non-limiting example embodiments, upon receipt, without an appropriate decryption key, a viewer is only able to playback the freely accessible video including obscured images as rendered from transformed image data. With an appropriate decryption key, the viewer is able to play back the video with obscured images as well as playback the original video. Thus, a viewer can use the decryption key to decrypt the encrypted portion of the images to convert obscured images back into the original form. In such an instance, the personal information is then available for viewing.

These and other embodiments will be discussed in more detail below.

Embodiments herein can include a configuration of one or more computerized devices, workstations, handheld or laptop computers, or the like to carry out and/or support any or all of the method operations disclosed herein. In other words, one or more computerized devices or processors (such as a monitoring system, analyzer, etc.) can be programmed and/or configured to operate as explained herein to carry out different embodiments.

Yet other embodiments herein include software programs to perform the steps and operations summarized above and disclosed in detail below. One such embodiment comprises a computer program product that has a computer readable storage medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes computer readable storage media having instructions stored thereon for supporting operations such as those as described herein. The instructions, when carried out by one or more processor devices of a respective computer system, cause the one or more processor devices to: receive original image data obtained based on monitoring a retail environment, the original image data capturing at least private information and occurrence of activity in the retail environment; and apply at least one transform to the original image data to produce transformed image data, application of the at least one transform sufficiently distorting portions of the original image data to remove the private information, the transformed image data including the distorted portions to prevent access to the private information, the distorted portions retaining sufficient image detail from the original image data to discern occurrence of the activity in the retail environment.

Note that the ordering of the steps has been added for clarity sake; these steps can be executed in any suitable order.

Other embodiments of the present disclosure include software programs to perform any of the method embodiment steps and operations summarized above and disclosed in detail below.

Also, it is to be understood that the embodiments herein can be a software program, a combination of software and hardware, or as hardware alone. Example embodiments of the invention may be implemented within computer systems, processors, and computer program products and/or software applications manufactured by Stoplift, Inc. of Cambridge, Mass., USA.

As discussed above, techniques herein are well suited for use in securing private information captured in retail environments. However, it should be noted that embodiments herein are not limited to use in such applications and that the techniques discussed herein are well suited for other types of security applications as well.

Additionally, although each of the different features, techniques, configurations, etc., herein may be discussed in different places of this disclosure, it is intended that each of the concepts can be executed independently of each other or, where suitable, in combination with each other. Accordingly, the one or more present inventions as described herein can be embodied and viewed in many different ways.

This brief description of the disclosure does not specify every embodiment and/or incrementally novel aspect of the present disclosure or claimed invention(s). Instead, this brief description of embodiments herein only provides a preliminary discussion of different embodiments and corresponding points of novelty. Thus, the detailed description includes a further summary of the invention(s). For additional details and/or possible perspectives (permutations) of the invention (s), the reader is directed to the Detailed Description section below and corresponding figures of the present disclosure as further discussed below.

BRIEF DESCRIPTION OF THE DRAWINGS

The foregoing and other object s, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIGS. 4-12 are example diagrams illustrating transformation of original image data to transformed image data according to embodiments herein.

FURTHER SUMMARY AND DETAILED DESCRIPTION OF EMBODIMENTS

Figure 1:
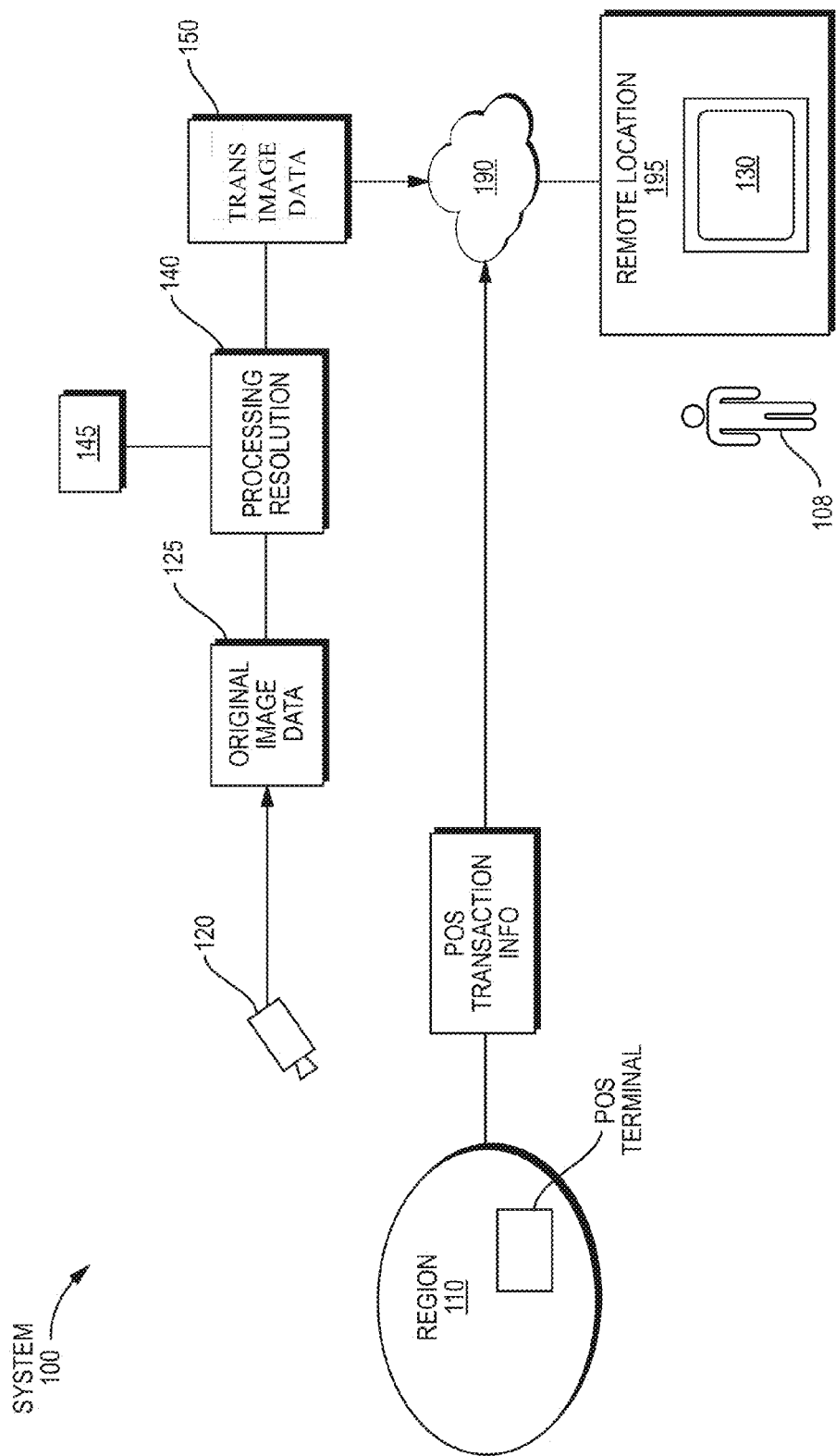
FIG. 1 is an example diagram of a monitoring retail system and transforming image data according to embodiments herein.

FIG. 1 is an example diagram of system 100 according to embodiments herein. As previously discussed, embodiments herein include novel ways of providing security in image producing applications.

As shown, system 100 includes surveillance system 120 (such as a camera, motion detector, etc.) that monitors region 110 such as a retail environment. Surveillance system 120 (e.g., image generating device) produces original image data 125. The image data 125 can be video, still images, etc., of objects present in the monitored region 110. The original image data 125 produced by surveillance system 120 captures sufficiently detailed images including private information such as faces, credit card information, etc., present in monitor region 110

The objects captured in original image data 125 produced by surveillance system 120 include any tangible matter such as persons, retail items, equipment, shopping carts, payment terminals, signs, etc.

System 100 includes processing resource 140. Processing resource 140 receives the original image data 125 produced by the surveillance system 120. In one embodiment, the original image data 125 captures at least private information and occurrence of activity visible in the monitored region 110.

The processing resource 140 applies one or more transforms to the original image data 125 to produce transformed image data 150. Application of the at least one transform 145 (e.g., one or more transforms) sufficiently distorts portions of the original image data 125 to remove the private information from viewing when it is played back on a playback device. The transformed image data 150 as produced by the processing resource 140 includes the distorted portions or original image data 125 to prevent access to the private information. However, the distorted portions of the image data in the transformed image data 150 retain sufficient image detail from the original image data 125 to enable a viewer to discern occurrence of the activity in the retail environment. Thus, the distortion caused by transformation is limited so that the activity captured by the original image data 125 is still discernible in the transformed image data 150.

The transformed image data 150 can be transmitted over network 190 to a remote location 195. The remote location 195 can include a display screen 130 to view a rendition of the transformed image data 150. In this example, user 108 or multiple users view the rendition of the transformed image data 150 to detect activities, events, conditions, etc., that occur at the checkout in a retail establishment. More specifically, based on viewing of the distorted images as a result of performing the transform, the reviewer can identify occurrence of events such as improper scanning of an item at a point of sale checkout terminal, an attempt by a customer to leave the store without paying for items in a shopping cart (a.k.a., a cart push-out), customer in need of help, etc. However, since the private information has been removed, the user 108 (e.g., reviewer) is unable to view the private information.

As discussed herein, the personal information removed from the original image data can come in several forms. By way of a non-limiting example, the personal information removed can be data, such as usernames, passwords, credit card numbers, names, telephone numbers, or social security numbers. Further by way of a non-limiting example, personal information also can include biometric data such as fingerprints, retinal prints, images, faces, etc.

In contrast to conventional systems that occlude or distort a region of interest beyond recognition, embodiments herein include sufficiently distorting images to remove private or potentially sensitive information, but preventing over distortion of the images such that a viewer is able to discern occurrence of activities. As an example, the distortion can remove image portions or distort original images to prevent a reviewer from identifying a particular person that is purchasing an item in a retail environment. The distorted portion of an image such as a face can be recognizable as being a face even though the reviewer cannot actually identify a particular person to which the face belongs. However, even though a particular person may not be recognizable from the distorted portion of the images, the distorted portion of the image still conveys to the reviewer actions or activity such as that a person is purchasing an item in the retail environment. Thus, a party (or portion thereof) may be obscured to remove personal information. However, the actions of the distorted party (or portion thereof) are discernible to the viewer when playing back the transformed image data 150.

In accordance with further embodiments, the original image data can be video data produced b the surveillance system 120. The video can include a sequence of still images (e.g., frames), a combination of which capture motion and actions. The images can include activity such as scanning of an item at a point of sale terminal. Embodiments herein can include sufficiently distorting sequential images in the video to prevent viewing of the private information from one frame to the next. However, as mentioned, the distortion to the original image data 125 during a transform is not so great that the activity captured by the video is unrecognizable when viewing a rendition of the transformed image data 150. Thus, a portion or all of each frame may be distorted, but the reviewer is able to detect occurrence of activity captured by the video.

Note that the monitored region 110 can include a point of sale terminal that generates a notification when an item is scanned for purchase. As mentioned, proper scanning at the point of sale terminal can include producing an audible tone to notify the scanner that the retail item was properly scanned. In one embodiment, the processing resource receives point of sale transaction data produced during a respective transaction captured by surveillance system 120.

Embodiments herein can include forwarding the point of sale transaction information over network 190 to the remote location 195 along with or in a different channel than the transformed image data 150. The point of sale information can be synchronized with the transformed image data 150 such that the viewer reviewing playback of the transformed image data 150 is able to view distorted images of the transaction as well as be notified (via the point of sale information) when a particular event occurs with respect to the image captured transaction. Notification of the event may help the reviewer know when a visual event of interest is more likely to occur in playback of the distorted images. For example, the notification derived from the point of sale information can indicate when a retail item passes a scan window and is detected by the point of sale system). The notification to reviewer of this event enables the reviewer to detect improper scanning of retail items.

Figure 2:
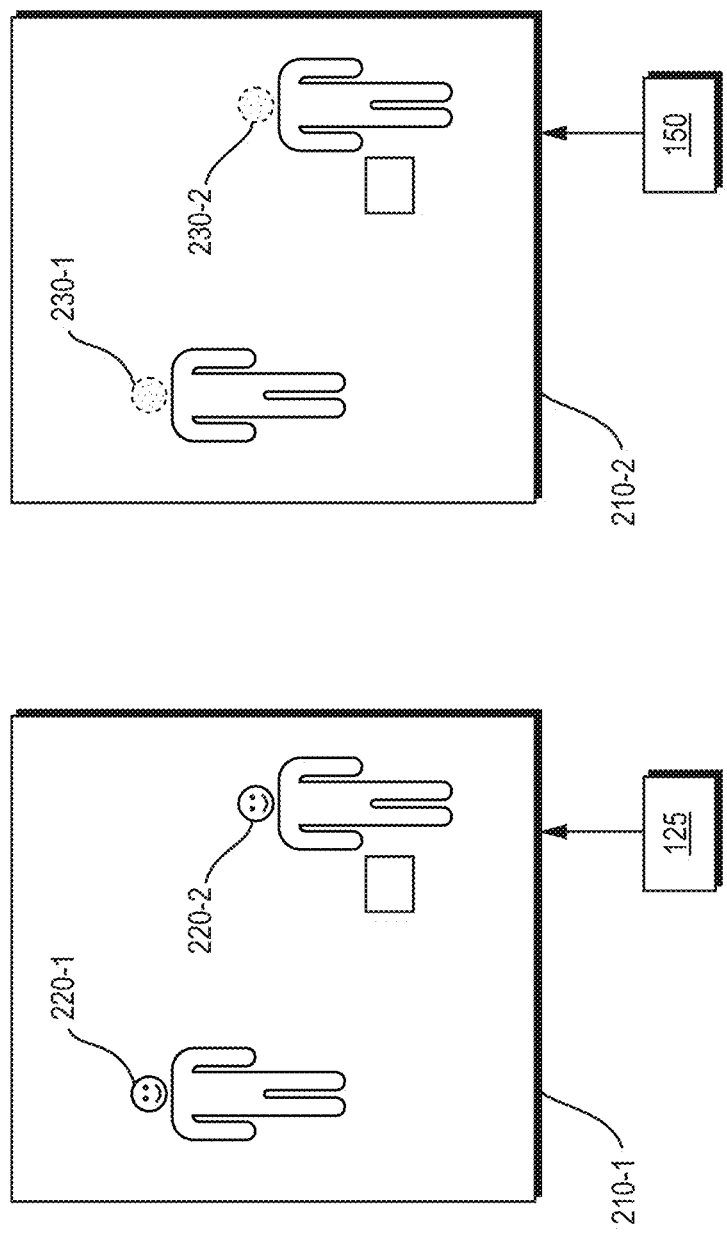
FIG. 2 is an example diagram illustrating transforming a region of interest according to embodiments herein.

FIG. 2 is an example diagram illustrating a rendition of original image data versus a rendition of transformed image data according to embodiments herein.

As shown, the rendition 210-1 of original image data 125 includes multiple persons captured by surveillance system 120. In this non-limiting example, rendition 210-1 includes region of interest 220-1 (such as a face of a first person) and region of interest 220-2 (such as a face of a second person). The processing resource 140 can apply any suitable algorithm such as a face recognition algorithm to identify the one or more regions of interest.

The processing resource 140 applies one or more transforms 145 to the original image data 125 to distort regions of interest 220 (e.g., private information). For example, the processing resource 140 modifies at least portions of the original image data 125 to produce transformed image data 150 such that the rendition 210-2 as derived from playback of transformed image data 150 includes a distortion of images in region of interest 220-1 and 220-2. More specifically, the processing resource 140 produces the transformed image data 150 such that region of interest 230-1 in rendition 210-2 generally represents a person's head even though specific identity information associated with region of interest 220-1 has been removed to produce region of interest 230-1. The processing resource 140 produces the transformed image data 150 such that region of interest 230-2 in rendition 210-2 generally represents a person's head even though specific identity information associated with region of interest 220-2 has been removed to produce region of interest 230-2.

Thus, in accordance with embodiments herein, the processing resource 140 can analyze the original image data 125 to detect presence of an object of interest such as one or more faces. For each frame of video including the object of interest, the processing resource 140 identifies a region of pixels that in the frame that are used to render the respective object. For each frame, the processing resource 140 selectively applies one or more transforms to the region of picture elements representing the object of interest (a face in this example) in the original image data to produce the transformed image data 150 in which the object of interest is distorted while neighboring regions in the frame are not distorted. Thus, in one embodiment, only the objects of interest may be distorted.

Additionally, note that the processing resource 140 can be configured to produce the transformed image data 150 such that region of interest 230-2 in rendition 210-2 generally represents a person's head. Specific identity information such as detailed facial features associated with region of interest 220-2 have been removed to produce region of interest 230-2.

As previously discussed, the surveillance system 120 can be configured to produce original image data 125 based on monitoring region 110 such as a retail environment. In such an instance, the processing resource 140 analyzes the original image data 125 to detect presence of at least one object in the retail environment. The processing resource 140 then selectively applies the one or more transforms 145 to detected picture elements representing the at least one object in the original image data 125 to produce the transformed image data 150.

In accordance with further embodiments, as further described herein, the processing resource applies the indiscriminately applies the transform to distort the captured images without regard to particular objects.

Figure 3:
FIG. 3 is an example diagram illustrating a view of a retail environment according to embodiments herein.

FIG. 3 is an example image of a monitored retail environment according to embodiments herein. The monitored retail environment can include a point of sale terminal, cashier operating the point of sale terminal, customer purchasing an item, payment terminals, etc.

In this example view of the retail environment, image 300 includes display of observed personal information such as face 310-1, face 310-2, payment terminal 320, etc.

Two strategies stand out as the most effective ways of safeguarding personal information. One way is to encrypt the personal information and only store the encrypted personal information. In this way, even if the video including image 300 were stolen, the thief would not have the means to decrypt the information and retrieve the personal information. However, if the thief were to also obtain the encryption keys, he or she would then be able to retrieve and view the personal information displayed in image 300.

Another way to safeguard information is to remove the personal information entirely from the image 300 and not store it at all. This can be accomplished by deleting, hashing, etc., portions of data that are used to render the personal information. In this way, the personal information is removed, and thus cannot be stolen.

Embodiments herein include safeguarding personal information visible in video streams (and/or still images) by applying image transforms that effectively remove the personally identifiable features from the imagery whilst preserving enough detail to allow a viewer or investigator to maintain an understanding of what is going on in the video, thereby preserving the utility of it. Embodiments herein provide a sense of security for organizations or individuals utilizing third party analysts (e.g., reviewers located at remote locations such as remote location 195) to review their video or those utilizing cloud-based technologies for storage and retrieval of video footage.

Multiple methods are described for removing personal information from imagery: selective transforms (applied discriminately) and whole-scene transforms (applied indiscriminately).

Selective transforms involve manipulating the imagery only in selected locations, namely those where personal information is visible in a respective image. Whole-scene image transforms operate on substantially the entire image, irrespective of where any personal information may be.

Typically, selective transforms are better at preserving image detail, which is of benefit to the viewer. However, the selection process itself can be error-prone, potentially reducing the effectiveness of the transform at removing personal information from images. Whole-scene image transforms are the safest option for removal of personal information, though at the cost of eliminating detail in other areas that could facilitate review of such video. Several image transforms can be used in both the whole-scene and selective removal cases. In general, any whole-scene transform can also be used selectively, and there are some selective transforms that only make sense to use on a selective basis.

Selective Transforms

Selective transforms are image transform operations performed on select regions of the imagery rather than on the imagery as a whole. Such regions can be chosen statically, as would be appropriate, for instance, to mask out a payment terminal including a pad to enter a PIN (Personal Identification Number). Often, however, the area we wish to hide personal information details move with the people within the scene. The selected areas of masking, therefore, follow the individuals. In this example, image 300 includes both dynamic regions (e.g., face 310-1, face 310-2) and static selection regions (e.g., payment terminal 320). The dynamic regions can move about a viewing area. The static regions are generally fixed regions.

Calculating dynamic selective regions such as face 310-1, face 310-2, etc., can be done using standard computer vision techniques. For instance, the processing resource 140 can employ standard face detection techniques to identify faces within the imagery and use that as the basis of creating a selective region on which to perform an identify masking transform. Motion and/or tracking based approaches can also be used to calculate bounding boxes. These bounding boxes can then be used as the dynamic selective masking region.

The static regions may be pre-known because they always are present in a particular or fixed location in an image.

Distortion of images can be based on detection of movement. For example, in one embodiment, the processing resource 140 processes the original image data 125 to detect occurrence of movement captured in the original image data 125. The processing resource applies any of one or more different types of transforms 145 (e.g., a blur transform, color transform, etc.) to distort the portions in the original image data 125 that represent the movement to produce the original image data 125.

The movement detected by the processing resource 140 can represent one or more objects in the original image data 125 that move from one frame to the next. The processing resource 140 can detect presence of the one or more moving objects in any suitable manner such as by comparing one frame of video to the next to determine which picture elements (e.g., pixels) have changed. Based on such information, the processing resource 140 can identify one or more moving objects captured in the original image data 125. The processing resource 140 applies at least one transform 145 to regions of the image data 125 representing the identified one or more moving objects to produce the transformed image data 150. Application of the at least one transform 145 distorts settings of picture elements representing the one or more moving objects.

In yet further embodiments, the processing resource 140 can analyze the original image data 125 to track movement of objects captured by the original image data 125. Tracking movement can include the processing as discussed above as well as additional processing. For example, the processing resource 140 can identify the presence of one or more objects in the original image data 125 based on movement or knowing shape, color, etc., of the object to be detected.

The processing resource 140 selectively applies one or more transform 145 to picture elements in the original image data 125 representing the moving objects to produce the transformed image data 150.

Tracking the one or more objects is useful because a moving object may temporarily stop moving in multiple frames in received video produced by the surveillance system 120. In such an instance, the processing resource 140 continues to apply the transform to the identified object of interest even though the tracked object happens to stop moving temporarily. This prevents moving objects from being displayed in full detail when they temporarily stopped, preventing disclosure of personal/private information.

Identity Masking Image Transforms

Various identity masking image transforms are described below. Their utility can be measured on a two-axis scale based on their effectiveness at masking personal information and on their capacity to retain scene details necessary to the understanding of what is going on in the video, which we refer to as the gist of the scene. As mentioned above, image transforms such as the ones described below may be applied to the whole scene or only to selective regions, or in combinations thereof.

Image Blurring

Figure 4:
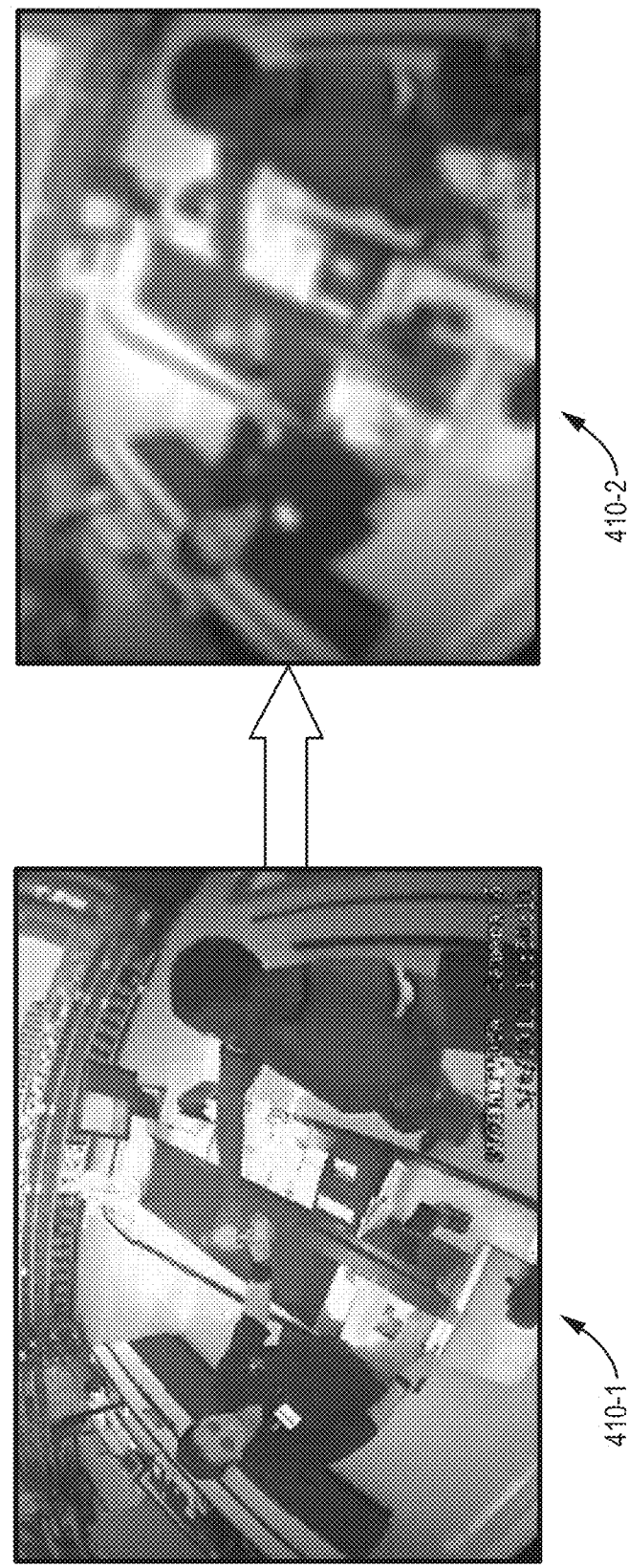

FIG. 4 is an example diagram illustrating modification of an image according to embodiments herein.

In this example, the processing resource 140 transforms image 410-1 captured by surveillance system 120 into image 410-2.

As shown, blurring the image 410-1 to produce image 420-2 is an effective way of removing private information. However, it also blurs other details, such as object details, making the scene more difficult to understand.

Color Dilation

Figure 5:

FIG. 5 is an example diagram illustrating modification of an image according to embodiments herein.

In this example, the processing resource 140 transforms image 510-1 captured by surveillance system 120 into image 510-2. Transformation in this example embodiment includes dilating the colors of the image 510-1 within some neighborhood of each pixel. For example, color dilation in this example can involve computing the max color value within a window and replacing the center pixel with that value. This is effective at removing identifying features, but at a cost of being able to easily understand what is occurring in the image 510-2.

Figure 6:
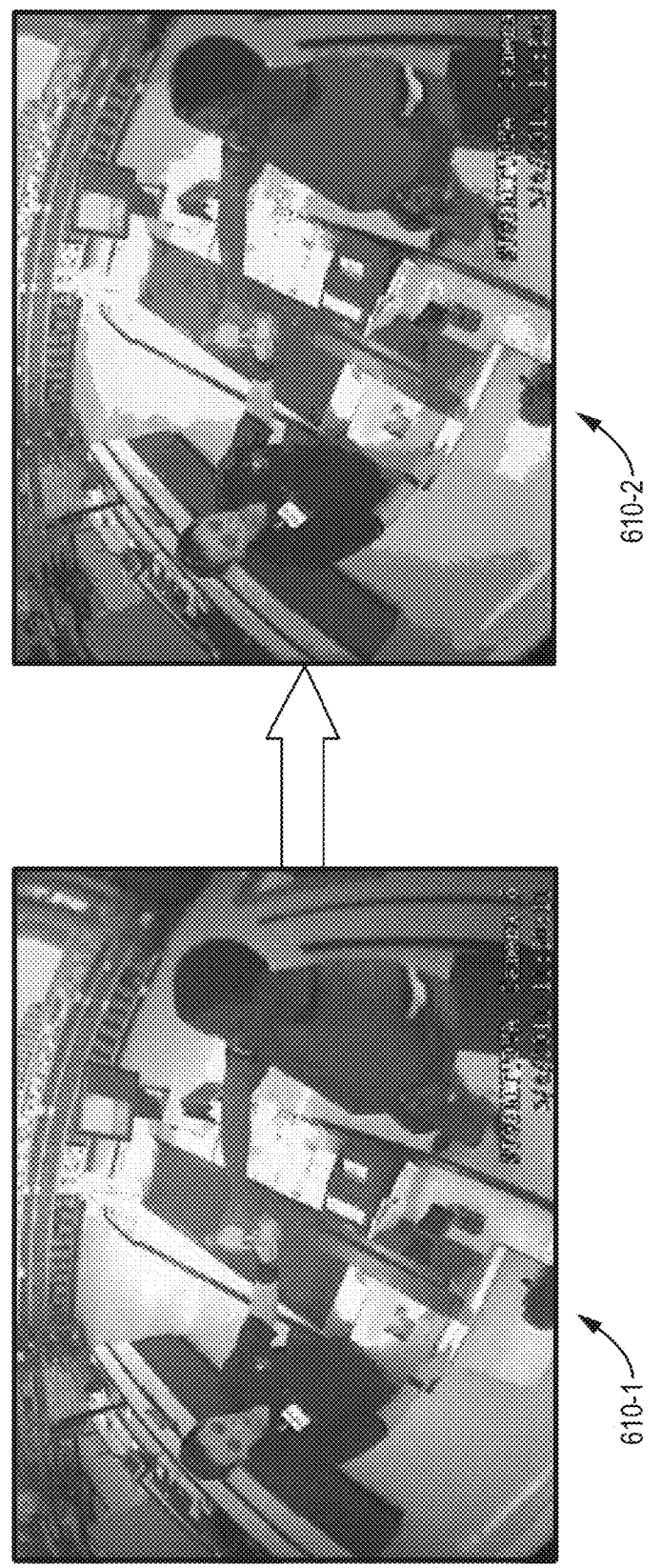

FIG. 6 is an example diagram illustrating modification of an image according to embodiments herein.

In this example, the processing resource 140 transforms image 610-1 captured by surveillance system 120 into image 610-2. Transformation in this example includes reducing the number of colors that are used in the image 610-2 compared to those in image 610-1. Reducing color variation may be less effective than other approaches at masking detail, but such a transform retains scene understanding. Such a transform is typically most effective at mid to far field scenes.

Edge Image Transform

Figure 7:
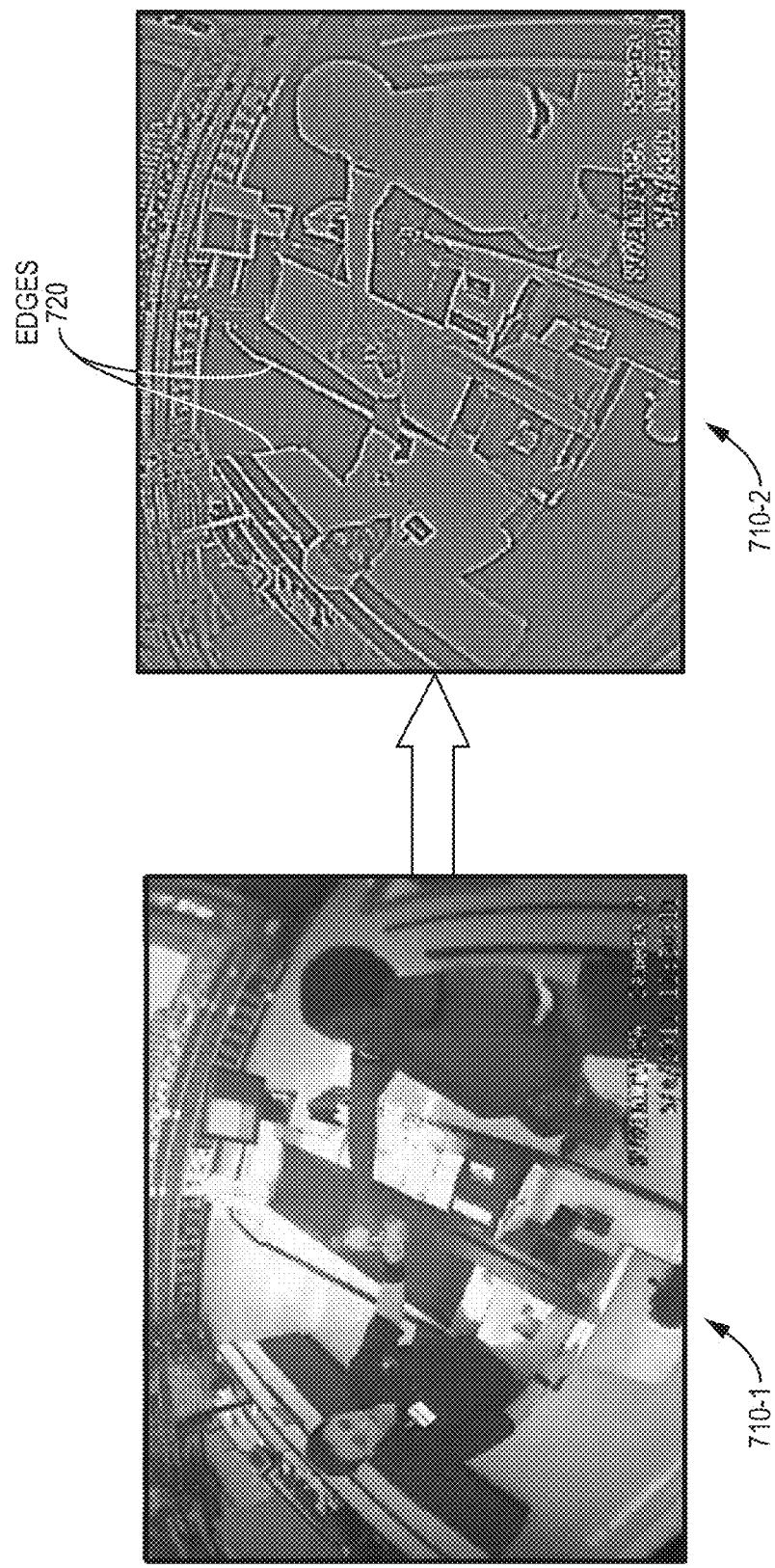

FIG. 7 is an example diagram illustrating modification of an image according to embodiments herein.

In this example, the processing resource 140 transforms image 710-1 captured by surveillance system 120 into image 710-2 including edges 720 as well as distorted portions of the original image.

Transforming the image 710-1 into image 710-2 including an edge representation is rather effective in masking identity while still retaining a surprising amount of scene understanding. There are several possible methods that can be used to of produce such edge images, including using pure edge detection algorithms like the Canny edge detector. However, it may be more effective to use the outputs of derivative filters directly. The images in the example embodiment of FIG. 7 were performed by taking the Laplacian of the image, which preserves all edges regardless of edge direction. In general, the edges or lines illustrate an outline objects present in the monitored region 110.

Combination Transform

FIG. 8 is an example diagram illustrating modification of an image according to embodiments herein.

In this example, the processing resource 140 transforms image 810-1 captured by surveillance system 120 into image 810-2.

Image transforms can be used in conjunction with each other in order to maximize masking properties and scene understanding. The transform shown above is a combination of edge transform and color dilation.

In accordance with this example embodiment, first, via or 140, the original image 810-1 is transformed according to the dilation transform and the Laplacian transform (both described previously) independently. The resulting transformations are then combined to form the above hybrid transform image shown in image 810-2.

In this non-limiting example, the resulting transforms were combined according to the strength of the edge in the Laplacian image. The stronger the edge signal, the more that signal was favored in the hybrid transform. This has the effect of choosing the dilated image pixel's color when little edge information is present and choosing the Laplacian image's edge when that edge signal is strong. Thus, regions of the image 810-1 where there is strong detection of an edge (e.g., transition between two different objects in the image 810-1), the corresponding locations in image 810-2 include a line, demarcation, highlighting, etc., representing the transition. For regions where there is a weak or no detected edge in the original image 810-1, the corresponding locations in image 810-2 include the original portion or distorted original portion from image 810-1.

The effect of the hybrid transform is to preserve edges that are otherwise lost when transforming the image 810-1 into image 810-2. For example, transforming an image can result in removing details from images, making it difficult to identify boundaries or edges between objects. Processing the image 810-1 to identify locations of edges, boundaries, etc., and adding such distinctive features (e.g., edges, boundaries, etc.,) back into the image 810-2 makes it easier to understand the gist of the scene, while removing personal information.

This is an effective transform for identity masking, due in part because it effectively hides identity due to the illustration-like effect of the false-color edges, and due in part because the gist of the scene remains easy to follow, without any additional training or experience.

Local Mosaic

Figure 9:

FIG. 9 is an example diagram illustrating modification of an image according to embodiments herein.

In this example, the processing resource 140 transforms image 910-1 captured by surveillance system 120 into image 910-2.

In this non-limiting example embodiment, the processing resource 140 applies a coarse blur "mosaic" transform to specific regions of the image 910-1. Though such transforms can be used as a whole-scene masking transform, they are better suited for selective use due to their relatively poor performance in retaining the gist of the scene. The degree of blurring can vary depending on the embodiment. As previously discussed, one embodiment herein includes limiting distortion such that activity can be recognized in the distorted regions.

Local Hard Masking

Figure 10:

FIG. 10 is an example diagram illustrating modification of an image according to embodiments herein.

In this example, the processing resource 140 transforms image 1010-1 captured by surveillance system 120 into image 1010-2. Selected private portions of the image 1010-1 are completely blocked out to produce image 1010-2.

A close cousin of the Local Mosaic transform is the simple one-color mask applied over the region of interest (e.g., face, payment terminal, etc.) to be concealed. And, like the Local Mosiac, this transform to produce image 1010-2 may be used in selective applications (e.g., applications in which a region of interest in the image is selected to be modified) as opposed to whole-scene applications in which the transform is applied indiscriminately to all picture elements in the original image to produce the transformed image.

Local Blurring

FIG. 11 is an example diagram illustrating modification of an image according to embodiments herein.

In this example, the processing resource 140 transforms image 1110-1 captured by surveillance system 120 into image 1110-2.

In this example embodiment, the processing resource 140 selects a particular region such as a face, payment terminal, etc., as locations in which to blur or distort the original image 1110-1 to produce image 1110-2. The selective application of the blur image transform effectively masks an identity of the personal information. However, in one embodiment, the transform is not so destructive when producing the image 1110-2 such that it is possible to detect that the distorted area represents a face. In other words, in one embodiment, if one were to view only the distorted area that is distorted (without the detailed background of an neck, arms, etc.), the viewer would be able to identify that the distorted object in image 1110-2 is a face.

Transform Combinations

FIG. 12 is an example diagram illustrating modification of an image according to embodiments herein.

In this example, the processing resource 140 transforms image 1210-1 captured by surveillance system 120 into image 1210-2.

In this example embodiment, the processing resource 140 combines use of multiple types of image transforms in order to produce effects that strengthen both the masking ability of the transform as well as to preserve scene understanding.

Figure 13:
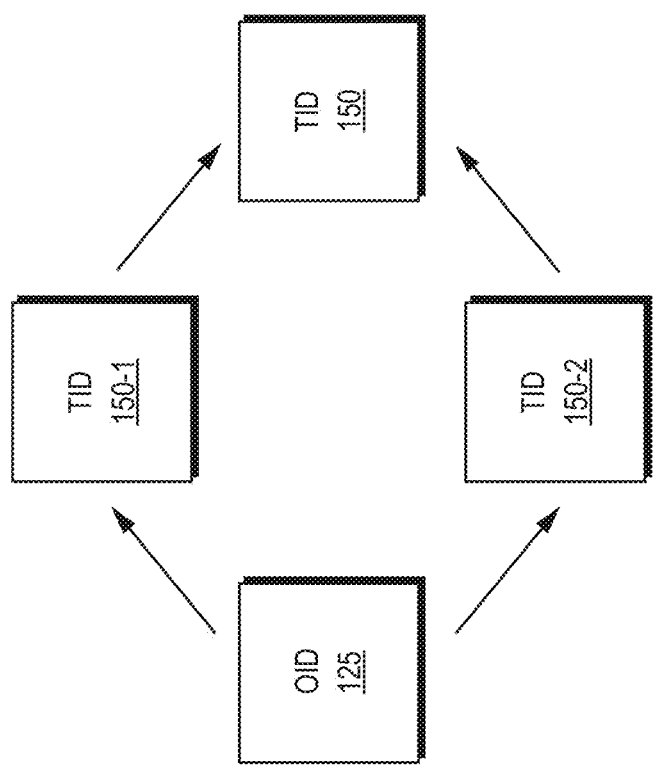
FIG. 13 is an example diagram illustrating transformation of content using multiple transforms according to embodiments herein.

As an example of using multiple transforms, as shown in FIG. 13, the processing resource 140 can apply a first image processing transform to the original image data 125 to produce a set of first transformed image data 150-1. The processing resource 140 applies a second image processing transform to the original image data 125 to produce second transformed image data 150-2. The processing resource 140 creates the transformed image data 150 based on a combination of the first transformed image data 150-1 and the second transformed image information 150-2.

In further example embodiments, the processing resource 140 creates the transformed image data by producing weighted contributions from each of the first transformed image data 150-1 and the second transformed image data 150-2. The magnitudes of the weighted contributions can depend on picture element settings in one or both of the first transformed image data 150-1 and the second transformed image data 150-2. The processing resource 140 combines the weighted contributions to produce the transformed image data 150.

By way of a non-limiting example, assume that the first image processing transform used to produce transformed image data 150-1 distorts all or specific portions of the original image data 125 to produce transformed image data 150-1. Assume that the second image processing transform identifies and highlights presence of edges between or amongst objects captured in the original image data 125 to produce second transformed image data 150-2.

Figure 17:
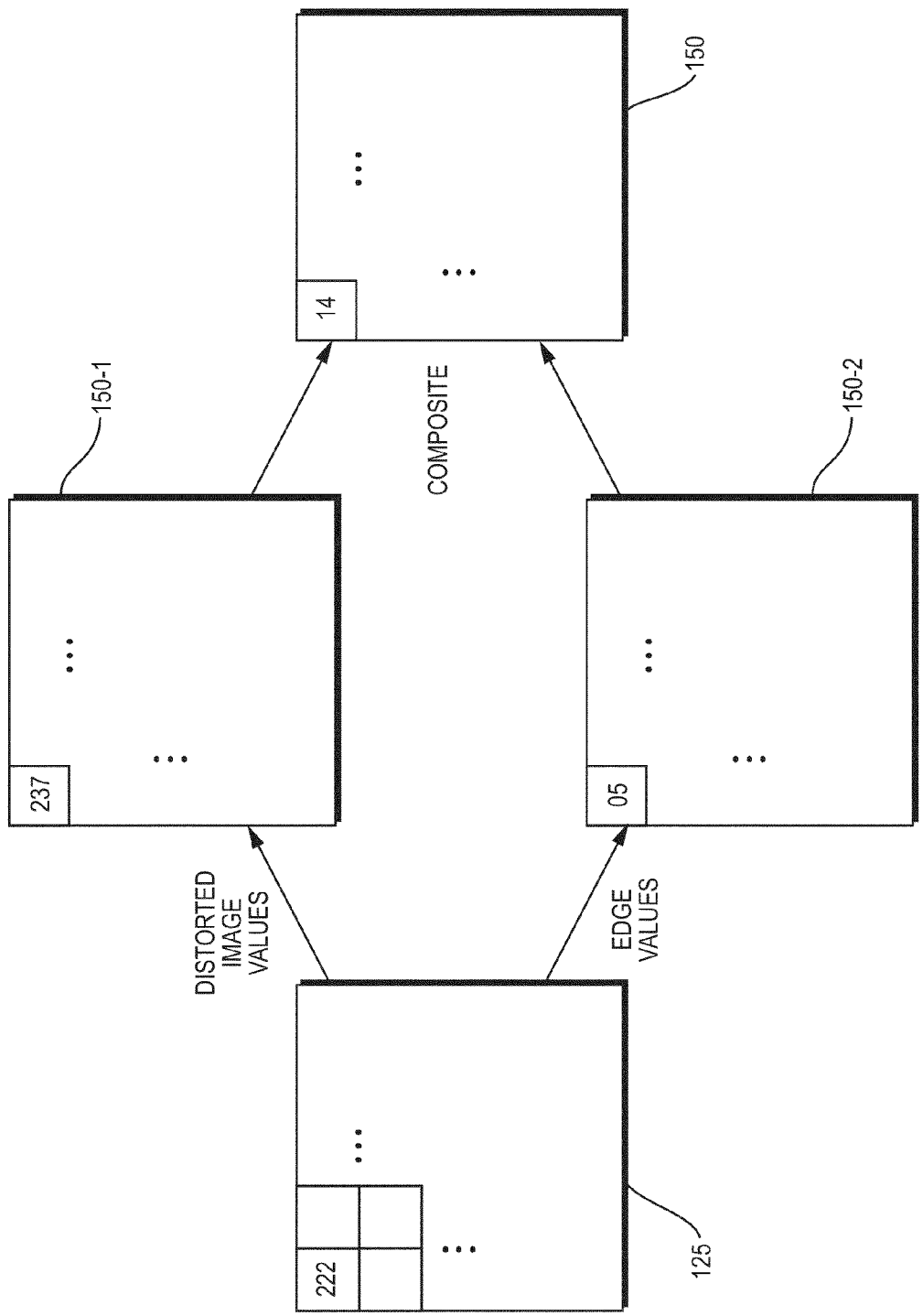
FIG. 17 is an example diagram illustrating generation of transformed image data according to embodiments herein.

In one embodiment, depending on a degree to which an edge is detected as being present in the original image data 125, the processing resource 140 produces weighted values for each picture element to produce a resulting pixel setting value for the transformed image data 150. For example, as shown in FIG. 17, the processing resource 140 receives original image data 125. The original image data 125 can include setting information indicating how each picture element is to be displayed on a display screen when the original image data 125 is rendered for viewing.

The processing resource 140 applies a first transform to produce transformed image data 150-1, which includes distorted values of the images as captured by original image data 125. To some degree, this distortion removes personal information as previously discussed.

The processing resource 140 applies a second transform to produce transformed image data 150-2. The settings in the transformed image data 150-2 indicate a degree to which the respective pixel location represents an edge in the original image. By way of a non-limiting example, the processing resource 140 produces transformed image data 150 based on a composite of transformed image data 150-1 and transformed image data 150-2. For example, for each pixel location, the processing resource first generates an alpha value based on the following equation:

$$\text{alpha} = ABS(\text{edge value for pixel} - 128)/128 \quad \text{(eq. 1)}$$

The processing resource 140 generates a pixel setting value for the pixel location in the final transformed image data 150 based on the following equation:

$$\text{pixel setting} = \text{alpha} * \text{edge value} + (1-\text{alpha}) * \text{distorted value} \quad \text{(eq 2)}.$$

In this example, assume that the pixel in the top left corner of the edge image (e.g., transformed image data 150-2) is set to the value 05. In one embodiment, the edge values range between 0 and 255. Values nearer and end of the range such as near 0 or 255 indicate that the pixel location is near an edge. Values nearer a mid-range value of 128 indicate that pixel is most likely not an edge. The edge value=05 for the top left pixel in this example indicates that the pixel location is substantially near an edge.

As shown, the distorted value for the top left pixel is 237.

To determine a value for the top left pixel of transformed image data 150 (e.g., the composite result), the processing resource 140 first generates a value for alpha as follows:

$$\text{alpha} = ABS(05-128)/128 = 123/128 = 0.961$$

The value alpha is used to generate weighted values that are summed to produce the resulting setting value for the pixel under test.

In this example, the value for the top left pixel in the transformed image data 150 is calculated as follows:

$$\text{pixel setting} = 0.961*5 + (1-0.961)*237 = 0.961*5 + 0.039*237 = 4.805 + 9.243 = 14$$

The values 0.961 and 0.039 are weight values.

The pixel setting value for the top left pixel location in the transformed image data 150 is 14.

In a similar manner, the processing resource 140 produces weighted values for each pixel location to produce transformed image data 150 from multiple transforms.

The resulting image rendered from transformed image data 150 includes portions of edges (where they are strong) and portions of the distorted image (where the edges are weak).

Thus, embodiments herein include application of one or more image processing transforms to produce transformed image data 150, highlighting presence of edges detected in the original image data 125 and including a distorted view of portions of the original image data 125 lacking presence of edges.

Figure 14:
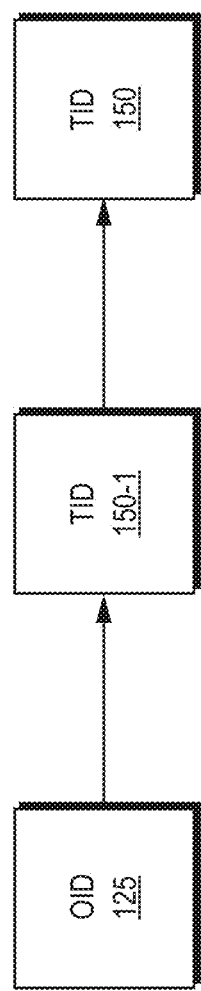
FIG. 14 is an example diagram illustrating transformation of content using multiple transforms according to embodiments herein.

FIG. 14 is an example diagram illustrating processing according to embodiments herein. As an alternative to performing multiple transforms in parallel, embodiments herein can include applying two or more transforms in series.

In this non-limiting example embodiment, the processing resource 140 can apply a first image processing transform to the original image data 150-1 to produce first transformed image data 150-1. The processing resource 140 then applies second image processing transform to the first transformed image data 150-1 to produce the transformed image data 150. Thus, embodiments herein can include application of multiple transforms in a cascade manner.

In view of the different transformation techniques as discussed above, note further that the processing resource 140 can combine both selective and full-scene transform capabilities for the same purpose. In this example, via a first pass transformation, full-scene color reduction is combined with selective application of image mosaics to mask face details. Furthermore, the static region (e.g., non-moving object) representing the payment terminal is masked using, for example, a single-color masking transform. In this way, one can preserve the best of both identity hiding and scene understanding by using selective (local) transforms, combined with the confidence and robustness that whole-scene masking provides.

As previously discussed, any of the transforms 145 (e.g., blur transform, color transform, etc.) used to distort images and image data as discussed herein can be applied in a specified region of interest (e.g., only to faces payment terminal, etc.) in the images or image data or the transform can be applied indiscriminately to the original image data without regard to objects represented in the original image data. In other words, in this latter case of indiscriminately applying the transform to an image, the processing resource 140 applies the one or more of the transforms 145 to substantially all of the original image data 125 to produce the transformed image data 150.

The benefit of modifying every picture element in one or more respective images to produce transformed image data 150 is that the processing resource 140 can process each of the regions in the original images in substantially the same way. When the processing resource 140 applies a respective one or more transform to a specific region (e.g., less than all of the image of interest), the processing resource 140 must keep track of which regions of interest to apply the respective one or more transforms.

In view of the embodiments discussed herein such as in FIG. 13, the processing resource 140 can be configured to perform different types of transformations on each of multiple passes. For example, in one non-limiting example embodiment, on a first pass transformation, the processing resource 140 indiscriminately applies a first transformation algorithm to a first region of the original image data 125 to produce transformed image data 150-1. On a second pass transformation, the processing resource 140 selectively applies a second transform algorithm to a second region of the original image data 125 to produce transformed image data 150-2.

In further embodiments, the second region to which the second transformation algorithm is applied can be smaller in size than the first region to which the first transformation algorithm is applied. The second region can reside within or outside the first region. The processing resource 140 produces the transformed image data 150 based on a combination of transformed image data produced from the first pass transformation and the second pass transformation.

The first transform algorithm can be of a same or different type than the second transform algorithm.

A degree to which the picture elements in the original images are distorted can vary for each pass. For example, in one embodiment, the first transform algorithm applied to the original image data 125 distorts the images in the image data to a lesser degree than does the second transform algorithm. Thus, distorted portions of the transformed image data 150-2 are more distorted than the distorted portions in the transformed image data 150-1. In other words, the multiple transformation algorithms applied to the original image data 125 can provide different amounts of distortion.

In accordance with further embodiments, the first transform algorithm can be the same type as the second transform algorithm. However, the processing resource 140 can apply the transform algorithm at different strengths for each transformation pass. For example, the processing resource 140 can apply the first transform at a lesser strength than the second transform. Thus, as mentioned in the above example, distorted portions of the transformed image data 150-1 can be more or less distorted than the distorted portions in the transformed image data 150-2.

In view of FIG. 14 as previously discussed, as an alternative to parallel processing, the processing resource 140 can identify a region of interest such as a face in the original image data 150 that is to be distorted. On a first pass transformation, the processing resource 140 applies a first transformation algorithm to a region (e.g., substantially whole image) larger than the region of interest in the original image data to produce first transform information (e.g., transformed image data 150-1). On a second pass transformation, the processing resource 140 applies a second transform algorithm to a location in the first transform information corresponding to the identified region of interest to produce the transformed image data 150. Thus, the first pass can include applying a transformation algorithm to a region of the original image data 125 that is larger than the identified region of interest. As mentioned, one transform pass can be applied to distort substantially the whole image. Another transform pass can be applied to further distort the identified region of interest (such as a face). Thus, embodiments herein can include multi-level distortion in different regions of interest.

Note that the order of applying the two transforms may not be important. Additionally, the two transforms may provide the same type of distortion to modified regions. In yet further embodiments, one transform may provide a higher degree of distortion than the other.

Invertible Transforms

Embodiments herein have thus far described the process of masking personal/private information by removing such information in transformed images. This is ideal from a security standpoint since what does not exist cannot be stolen. However, the transformation to remote personal information distorts respective images, which as discussed can have adverse effects on scene understanding and comprehension of activity captured by one or more images.

Note that another method of masking personal information involves encrypting the portions of the image data including personal information so that only those authorized parties having the encryption keys can retrieve such information from the encrypted image portions. The portion of image data that does not include the personal information is not encrypted. Thus, less than all of the image data is encrypted. If the image data is video, the amount of the image data that is encrypted can vary over time depending on ho much personal information is present in the video.

Simply encrypting the entire video itself is enough to guarantee a level security. Those with the encryption keys can decrypt the video and view it.

A more seamless process involves transmission of both a transformed version of the video (any one of the several one-way transforms described above) along with an unaltered, encrypted version of the video. In this example embodiment, the remote location 195 in FIG. 1 receives the transformed image data 150 with an encrypted version of the original image data 125. This allows seamless playback of the transformed image data 150 along with the ability of authorized user 108 to access or view an unaltered version of image data (e.g., original image data 125 or video captured b the surveillance system 120).

In accordance with further embodiments, another method is to transform the original image data 125 according to any of the one-way methods described previously to produce transformed image data 150 that is transmitted to remote location 195 for review. Along with the transformed image data 150, the processing resource 140 can produce one or more respective difference images based on a difference between the original image data 125 and the transformed image data 150. This difference information, or difference image, when "added" back to the transformed image, recreates the original image.

In video applications including multiple frames of images, a difference image can be computed for each frame in the sequence. The sequence of difference images can be used to produce so-called difference video information that can be used to convert the transformed video back into the original video.

The difference information can be encrypted and/or compressed and embedded into the video stream of transformed video itself. In this way, user 108 at the remote location can receive the transformed image data 150 as well as the difference image data (e.g., potentially encrypted). Via playback of receive transformed image data 150, the user 108 is able to view the transformed version of the images (i.e. the one without any visible personal information) of the original video captured by surveillance system 120. Authorized users can decrypt the difference information present in the video stream of transformed video, which when added back to the transformed version allows the reviewer to view the original video instead of the distorted video. This is a more compact and seamless version of simply sending the two video streams as discussed above including a combination of the transformed video stream and an encrypted version of the unaltered video.

In accordance with further embodiments, the parameters of the transform itself can be used to facilitate the inversion process. For example, by way of an illustrative example, suppose we had a transform that simply shifted the red color plane by 3 pixels in the x-direction and 5 in the y-direction with the portions shifted off the edge of the image wrapping around to the other side, thereby preserving all the pixels in the image. A simple way of inverting this process is to shift the red channel back. In this way, transforms can be inverted, and the amount of additional information that needs to be encrypted and transmitted with the transformed video is significantly less. Thus, the process of transforming can include modifying settings of picture elements in the original image data 125 to produce transformed image data 150 and then using the difference information at the remote location 195 to substantially convert the transformed image data 150 back into the original image data 125 for playback and viewing.

A complication which arises when applying this approach with the one-way identity masking transform describe previously is that there is no one-to-one mapping of an original image and a transformed image. Different pixel values in the original image may map to the same pixel value in the transformed image.

This problem can be solved in the following way. By way of a concrete example, suppose we are going to invert the Laplacian edge image transform. This transform can potentially allow multiple different pixel values in the original image to take on the same value in the transformed image. Namely, any area of solid color will transform to a 0 edge value. Thus, it is possible to create a mapping of locations in the transformed image with no edge information (solid colors) and map whole regions to single colors or a small subset of colors. In this way, the original image can be recreated using this mapping information and the transformed edge image. And, since the mapping information is tiny in comparison to the approach described above saving pixel level differences, a significant reduction in additional information necessary to achieve an inversion can be readily achieved.

Furthermore, stenographic approaches can be used to hide the encrypted difference signal or some other transform-specific method of inversion directly into the video stream itself.

The benefits of this approach are that the data is encapsulated into the video, allowing a more seamless integration and possibly allowing for higher compression of the difference channel.

In certain embodiments, one or more of transforms 145 are invertible. In such an instance, the transforms 145 enable conversion of the transformed image data 150 back into the original image data 150 via application of supplemental information to the transformed image data. The supplemental information used to substantially convert the transformed image data 150 back into the original image data 125 can be any suitable information such as difference information, a mathematical function, etc.

In one embodiment, the processing resource 140 (or other suitable resource) generates the transformed image data 150 as a first data stream such as an unsecured data stream. The processing resource 140 (or other suitable resource) generates a second data stream including the supplemental information as a secured data stream requiring authorization to access. As mentioned, a user at the remote location 195 can use a decryption key to decrypt the supplemental information. The user 108 then uses the decrypted supplemental information and the transformed image data 150 to produce the original image data 125 for playback and viewing. In this example embodiment, the second data stream including the supplemental information enables conversion of the first data stream (e.g., transformed image data 150) into the original image data 125.

In one embodiment, the second data stream or supplemental information can include one or more parameters related to the at least one transform used by the processing resource 140 to produce the transformed image data 150 from the original image data 125.

As mentioned above, the supplemental information included in the second data stream can indicate differences in picture element settings between the original image data 125 and the transformed image data 150. In such an embodiment, a processing resource at the remote location 195 adjusts the picture element settings in the transformed image data 150 based on adjustment values (or difference values) in the supplemental information.

The first and second data stream can be transmitted over network 190 in any suitable manner. For example, in one embodiment, a server resource transmits the first data stream (e.g., transformed image data 150) in a separate channel than the second data stream (e.g., encrypted supplemental information). In alternative embodiments as mentioned above, the server resource can combine the first data stream and the second data stream and transmit in a single channel over network 190 to a remote location 195.

Note that that the first data stream, second data stream, or a combination of both can be compressed using any suitable algorithm. For example, the processing resource 140 (or other suitable resource) can be configured to apply one or more compression algorithm to the first and/or second data stream. The one or more compression algorithms can be selected from the group consisting of: i) run length encoding of pixel delta, ii) Huffman/Zip-like compression of pixel deltas, iii) image processing parameter-based encoding, etc.

Figure 15:
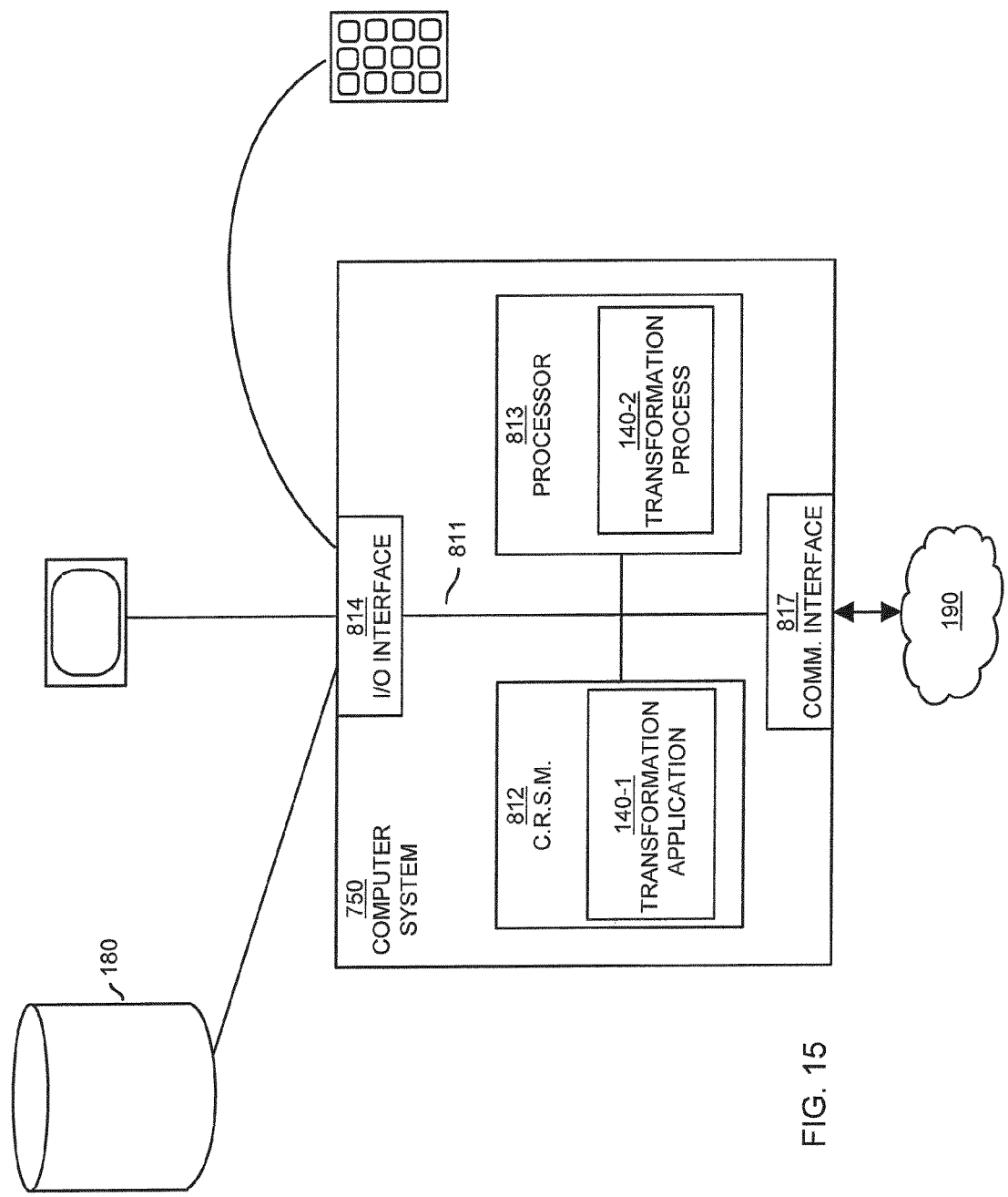
FIG. 15 is a diagram illustrating an example computer architecture for carrying out the different functionality according to embodiments herein.

FIG. 15 is an example block diagram of a computer system for implementing any of the operations as discussed herein according to embodiments herein.

Computer system 750 can reside in any of the resources as discussed herein. For example, the processing resource 140 can be embodied as computer system 750.

As shown, computer system 750 of the present example can include an interconnect 811 that couples computer readable storage media 812 such as a non-transitory type of media (i.e., any type of hardware storage medium) in which digital information can be stored and retrieved, a processor 813 (e.g., one or more processing devices), I/O interface 814, and a communications interface 817.

I/O interface 814 provides connectivity to other resources such as repository 180.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 750 and processor 813 to communicate over a resource such as network 190 to retrieve information from and/or transmit information to remote sources (e.g., remote processor) and communicate with other computers and/or persons. I/O interface 814 enables processor 813 to retrieve stored information from repository 180.

As shown, computer readable storage media 812 is encoded with transformation application 140-1 executed by processor 813. Transformation application 140-1 can be configured to include instructions to implement any of the transformation operations as discussed herein.

During operation of one embodiment, processor 813 accesses computer readable storage media 812 via the use of interconnect 811 in order to launch, run, execute, interpret or otherwise perform the instructions in transformation application 140-1 stored on computer readable storage medium 812.

Execution of the transformation application 140-1 produces processing functionality such as transformation process 140-2 in processor 813. In other words, the transformation process 140-2 associated with processor 813 represents one or more aspects of executing transformation application 140-1 within or upon the processor 813 in the computer system 750.

Those skilled in the art will understand that the computer system 750 can include other processes and/or software and hardware components, such as an operating system that controls allocation and use of hardware resources to execute the transformation application 140-1.

In accordance with different embodiments, note that computer system may be any of various types of devices, including, but not limited to, a set-top box, a television, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 750 may reside at any location or can be included in any suitable resource in a retail environment or external to a retail environment to implement functionality as discussed herein.

Functionality supported by the different resources will now be discussed via flowcharts in FIG. 16. Note that the steps in the flowcharts below can be executed in any suitable order.

Figure 16:
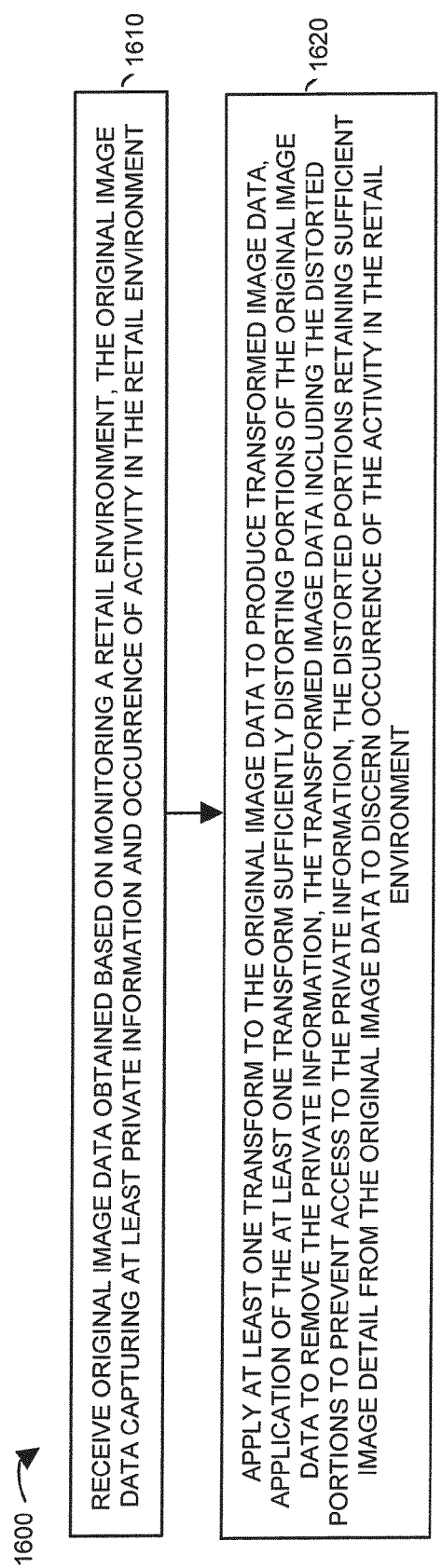
FIG. 16 is an example diagram of a method according to embodiments herein.

FIG. 16 is a flowchart 1600 illustrating an example method according to embodiments herein. Note that there will be some overlap with respect to concepts as discussed above.

In step 1610, the processing resource 140 receives original image data 125 obtained based on monitoring a region 110 such as a retail environment. The original image data 125 captures at least private information and occurrence of activity in the retail environment.

In step 1620, the processing resource 140 applies at least one transform 145 to the original image data 125 to produce transformed image data 150. Application of the at least one transform 145 sufficiently distorts portions of the original image data 125 to remove the private information. The transformed image data 150 includes the distorted portions to prevent access to the private information. The distorted portions include sufficient image detail to discern occurrence of the activity in the monitored retail environment.

Note again that techniques herein are well suited for use in retail environments. However, it should be noted that embodiments herein are not limited to use in such applications and that the techniques discussed herein are well suited for other applications as well. That is, the novel concepts as discussed herein can be implemented in any security system in which it is desirable to prevent viewing of private information in captured images such as a video, yet still be able to discern occurrence of activity in the captured images.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
   receiving original image data obtained based on monitoring a retail environment, the original image data capturing at least private information and occurrence of activity in the retail environment;
   applying at least one transform to the original image data to produce transformed image data, application of the at least one transform sufficiently distorting portions of the original image data to remove the private information, the transformed image data including the distorted portions to prevent access to the private information, the distorted portions retaining sufficient image detail from the original image data to discern occurrence of the activity in the retail environment; and
   wherein application of the least one transform highlights presence of edges in the original image data and distorts regions of the original image data lacking presence of edges.

2. The method as in claim 1, wherein applying the at least one transform includes:
   indiscriminately applying the at least one transform to the original image data without regard to objects represented in the original image data.

3. The method as in claim 1 further comprising:
   detecting occurrence of movement captured in the original image data; and
   distorting the portions in the original image data representing the movement.

4. The method as in claim 1 further comprising:
   identifying at least one moving object captured in the original image data; and
   applying the at least one transform to regions of the image data representing the identified at least one moving object, application of the at least one transform distorting settings of picture elements representing the at least one moving object.

5. The method as in claim 1, wherein applying the at least one transform includes:
   applying a first image processing transform to the original image data to produce first transformed image data; and
   applying a second image processing transform to the original image data to produce second transformed image data;
   creating the transformed image data based on a combination of the first transformed image data and the second transformed image information.

6. The method as in claim 5, wherein creating the transformed image data further comprises:
   producing weighted contributions from each of the first transformed image data and the second transformed image data, magnitudes of the weighted contributions depending on picture element settings in at least one of the first transformed image data and the second transformed image data; and
   combining the weighted contributions to produce the transformed image data.

7. The method as in claim 6, wherein application of the first image processing transform modifies the original image data to produce first transformed image data; and
   wherein application of the second image processing transform highlights presence of edges between objects in the original image data to produce second transformed image data.

8. The method as in claim 1, wherein applying the at least one transform includes:
   applying a first image processing transform to the original image data to produce first transformed image data; and
   applying a second image processing transform to the first transformed image data to produce the transformed image data.

9. The method as in claim 1 further comprising:
   applying the at least one transform to substantially all of the original image data to produce the transformed image data.

10. The method as in claim 1 further comprising:
    tracking movement of objects in the original image data; and
    selectively applying the at least one transform to picture elements in the original image data representing the moving objects to produce the transformed image data.

11. The method as in claim 1 further comprising:
    analyzing the original image data to detect at least one face; and
    selectively applying the at least one transform to picture elements representing the at least one face in the original image data to produce the transformed image data.

12. The method as in claim 1 further comprising:
    analyzing the original image data to detect presence of at least one object in the retail environment; and
    selectively applying the at least one transform to picture elements representing the at least one object in the original image data to produce the transformed image data.

13. The method as in claim 1, wherein applying at least one transform includes:
    on a first pass transformation, indiscriminately applying a first transformation algorithm to a first region of the original image data;
    on a second pass transformation, selectively applying a second transform algorithm to a second region of the original image data, the second region being smaller in size than the first region and residing within the first region; and producing the transformed image data based on a combination of the first pass transformation and the second pass transformation.

14. The method as in claim 13, wherein the first transform algorithm distorts the images in the image data to a lesser degree than does the second transform algorithm.

15. The method as in claim 14, wherein the first transform algorithm is the same as the second transform algorithm applied with different strength, where the first transform is applied with lesser strength than the second transform.

16. The method as in claim 13, wherein the first transform algorithm is of a different type than the second transform algorithm.

17. The method as in claim 1, wherein applying at least one transform includes:
identifying a region of interest in the original image data;
on a first pass transformation, applying a first transformation algorithm to a region larger than the region of interest in the original image data to produce first transform information;
on a second pass transformation, applying a second transform algorithm to a location in the first transform information corresponding to the region of interest to produce the transformed image data.

18. The method as in claim 1, wherein the at least one transform is an invertible transform enabling conversion of the transformed image data back into the original image data via application of supplemental information to the transformed image data.

19. The method as in claim 1 further comprising:
generating the transformed image data as a first data stream, the first data stream being an unsecured data stream; and
generating a second data stream as a secured data stream requiring authorization to access.

20. The method as in claim 19, wherein the second data stream enables conversion of the first data stream into the original image data.

21. The method as in claim 20, wherein the second data stream includes difference information indicating differences in picture element settings between the original image data and the transformed image data.

22. The method as in claim 20, wherein the second data stream includes parameters related to the at least one transform.

23. The method as in claim 19 further comprising:
transmitting the first data stream in a separate channel than the second data stream.

24. The method as in claim 19 further comprising:
applying at least one compression algorithm to the second data stream, the at least one compression algorithm selected from the group consisting of:
i) run length encoding of pixel delta,
ii) Huffman/Zip-like compression of pixel deltas,
iii) image processing parameter-based encoding.

25. A non-transitory computer-readable storage medium having instructions stored thereon for processing data information, such that the instructions, when executed by at least one processing device, cause the at least one processing device to perform the operations of:
receiving original image data obtained based on monitoring a retail environment, the original image data capturing at least private information and occurrence of activity in the retail environment;
applying at least one transform to the original image data to produce transformed image data, application of the at least one transform sufficiently distorting portions of the original image data to remove the private information, the transformed image data including the distorted portions to prevent access to the private information, the distorted portions including sufficient image detail to discern occurrence of the activity in the retail environment; and
wherein application of the at least one transform highlights presence of edges in the original image data and distorts regions of the original image data lacking presence of edges.

26. A system comprising:
at least one processor device;
a storage resource that stores instructions associated with an application executed by the at least one processor device; and
an interconnect coupling the at least one processor device and the storage resource, the at least one processor device executing the application and performing operations of:
receiving original image data obtained based on monitoring a retail environment, the original image data capturing at least private information and occurrence of activity in the retail environment;
applying at least one transform to the original image data to produce transformed image data, application of the at least one transform sufficiently distorting portions of the original image data to remove the private information, the transformed image data including the distorted portions to prevent access to the private information, the distorted portions including sufficient image detail to discern occurrence of the activity in the retail environment; and
wherein application of the at least one transform highlights presence of edges in the original image data and distorts regions of the original image data lacking presence of edges.

* * * * *